(12) United States Patent
Wu

(10) Patent No.: US 9,746,891 B2
(45) Date of Patent: Aug. 29, 2017

(54) COMPUTER

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Zhong-Gang Wu, Wuhan (CN)

(73) Assignees: HONG FU PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 94 days.

(21) Appl. No.: 14/683,604

(22) Filed: Apr. 10, 2015

(65) Prior Publication Data

US 2016/0170458 A1 Jun. 16, 2016

(30) Foreign Application Priority Data

Dec. 11, 2014 (CN) .......................... 2014 1 0754236

(51) Int. Cl.
*G06F 1/26* (2006.01)

(52) U.S. Cl.
CPC .................................... *G06F 1/263* (2013.01)

(58) Field of Classification Search
None
See application file for complete search history.

(56) References Cited

U.S. PATENT DOCUMENTS 6,453,423 B1 * 9/2002 Loison ...................... G06F 1/26
713/310
2013/0173833 A1 * 7/2013 Zou ...................... G06F 13/4022
710/301

\* cited by examiner

*Primary Examiner* — Paul Yanchus, III
(74) *Attorney, Agent, or Firm* — Steven Reiss

(57) ABSTRACT

A computer is used in a computer. The computer includes a resistor coupled to a motherboard of the computer, a control module, and an output module. The output module is coupled between the resistor and the control module. The control module is configured to control the output module to make a first response when the computer is in a S3/S4 state and control the output module to make a second response when the computer is working at a full speed. The motherboard is configured to output a first voltage to the output module when making the first response and output a second voltage to the output module when making the second response. The first voltage is configured to supply the addition card via the control circuit and the second voltage is configured to supply the addition card via the control circuit.

17 Claims, 4 Drawing Sheets

COMPUTER

CROSS-REFERENCE TO RELATED APPLICATIONS

This application claims priority to Chinese Patent Application No. 201410754236.4 Dec. 11, 2014, the contents of which are incorporated by reference herein.

FIELD

The subject matter herein generally relates to an electronic device.

BACKGROUND

A working state of a computer comprises a normal state (S0 state), a sleep state (S3 state), and a dormant state (S4 state), the computer is at full speed when in the S0 state. A first power supply circuit is not enough to supply power to a peripheral card (such as a network card or a display card) of the computer when the computer is in the S0 state. A first power supply and a second power supply circuit are too much for the peripheral card when the computer is in the S0 state. No power supply circuit supplies power to the addition card when the computer is in the S0 state.

BRIEF DESCRIPTION OF THE DRAWINGS

Implementations of the present technology will now be described, by way of example only, with reference to the attached figures.

DETAILED DESCRIPTION

Figure 1:
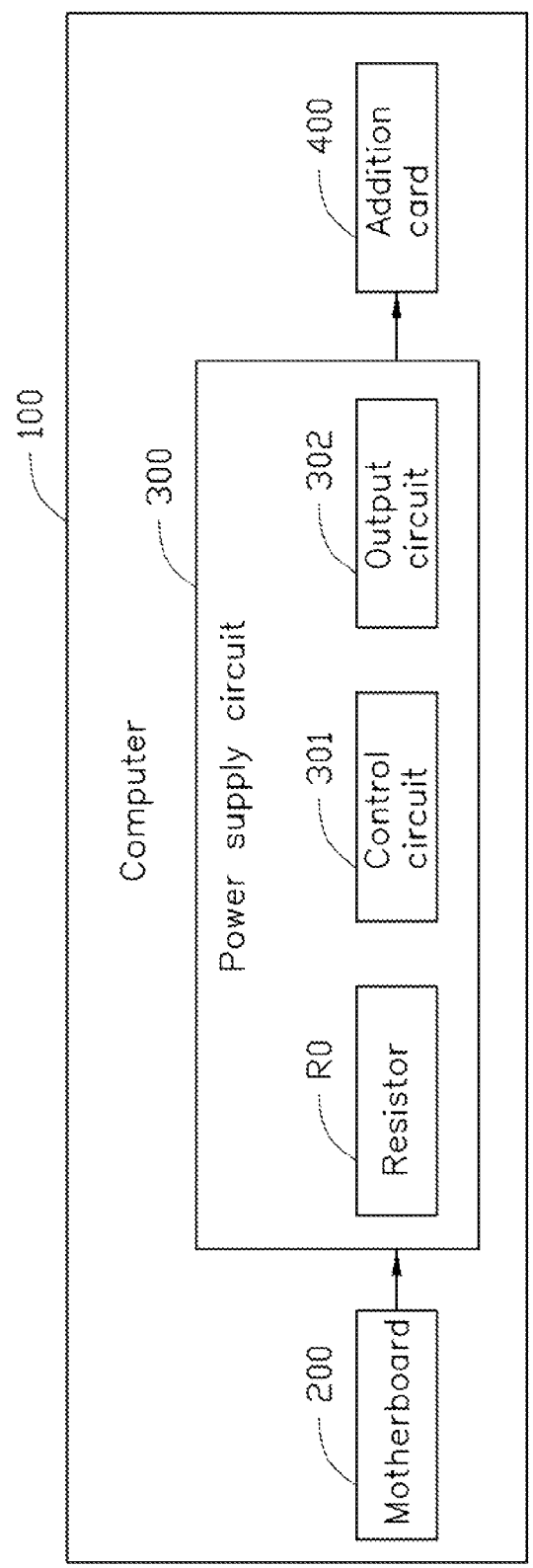
FIG. 1 is a block diagram of one embodiment of a computer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series, and the like.

The present disclosure is described in relation to a computer to output different voltages when being in different working states.

FIG. 1 illustrates an embodiment of a computer 100. The computer 100 comprises a motherboard 200, a power supply circuit 300, and an addition card 400. The power supply circuit 300 is configured to control the motherboard 200 to output a first voltage Vcc1 to supply the addition card 400 or output a second voltage Vcc2 to supply the addition card 400. The power supply circuit 300 is configured to couple to the addition card 400. In one embodiment, the addition card 400 comprises a PCI-E interface and can be a network card or a display card. The first voltage Vcc1 is a 3.3V_AUX standard voltage. The second voltage Vcc2 is a 3.3V standard voltage. A working state of the computer 100 comprises a normal state (S0 state), a sleep state (S3 state), and a dormant state (S4 state), and the computer 100 can be working at full speed when in the S0 state.

The power supply circuit 300 comprises a resistor R0, a control circuit 301, and an output circuit 302. The resistor R0 is configured to couple to the addition card 400, thereby enabling the control circuit 301 to receive a switch signal when the computer 100 is in the S3/S4 state. The control circuit 301 is configured to control the output circuit 302 to make a first response when the computer is in the S3/S4 state, thereby enabling the motherboard 200 to output the first voltage Vcc1. The control circuit 301 is further configured to control the output circuit 302 to make a second response when the computer is working at the full speed, thereby enabling the motherboard 200 to output the second voltage Vcc2.

The addition card 400 supports an arousal function when the computer 100 is in the S3/S4 state when the motherboard 200 outputs the first voltage Vcc1 to supply the addition card 400. The addition card 400 works in a normal state when the computer 100 is working at the full speed when the motherboard 200 outputs the second voltage Vcc2 to supply the addition card 400.

Figure 2:
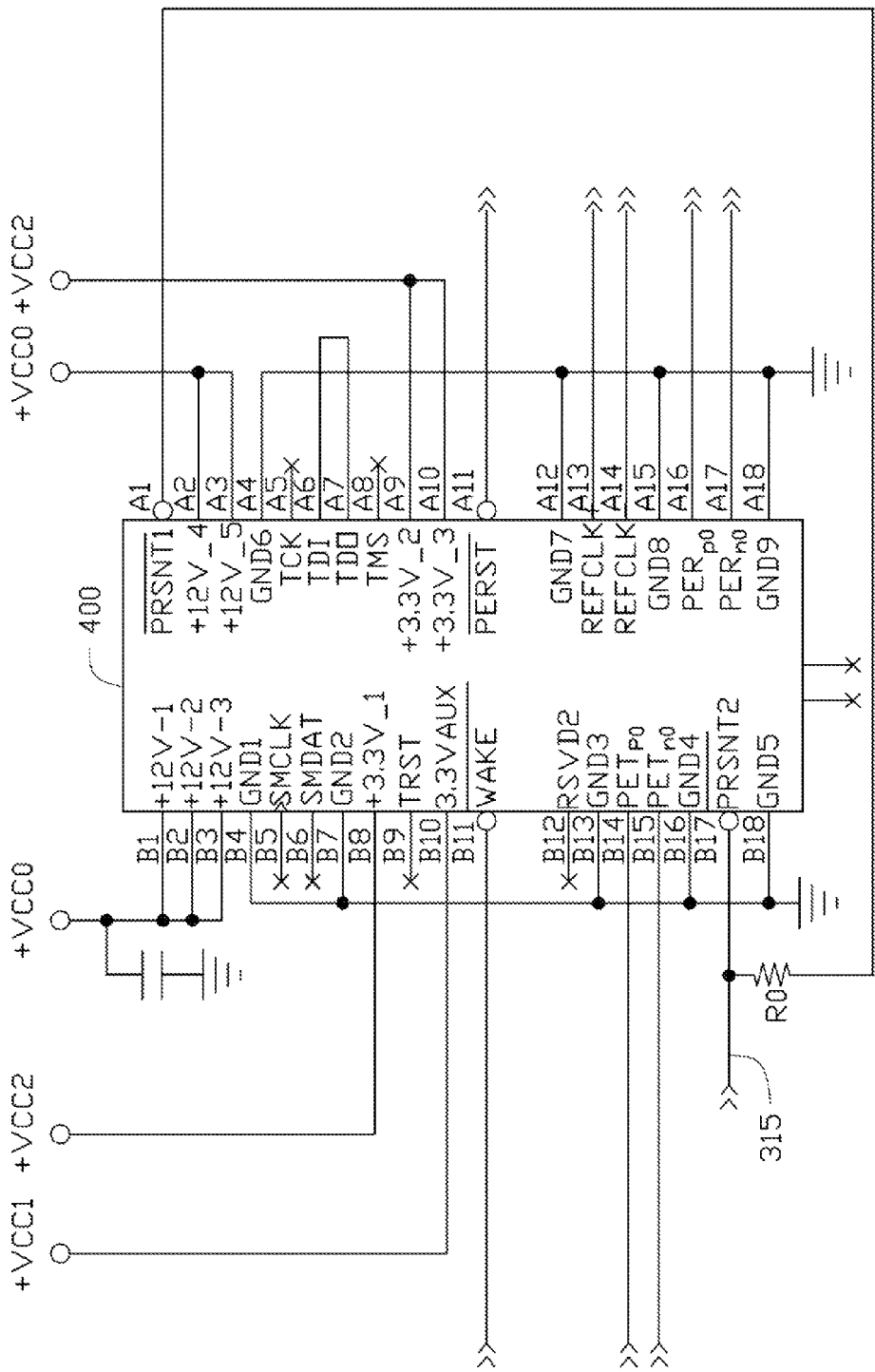
FIG. 2 is a circuit diagram of a resistor of the computer of FIG. 1.
Figure 3:
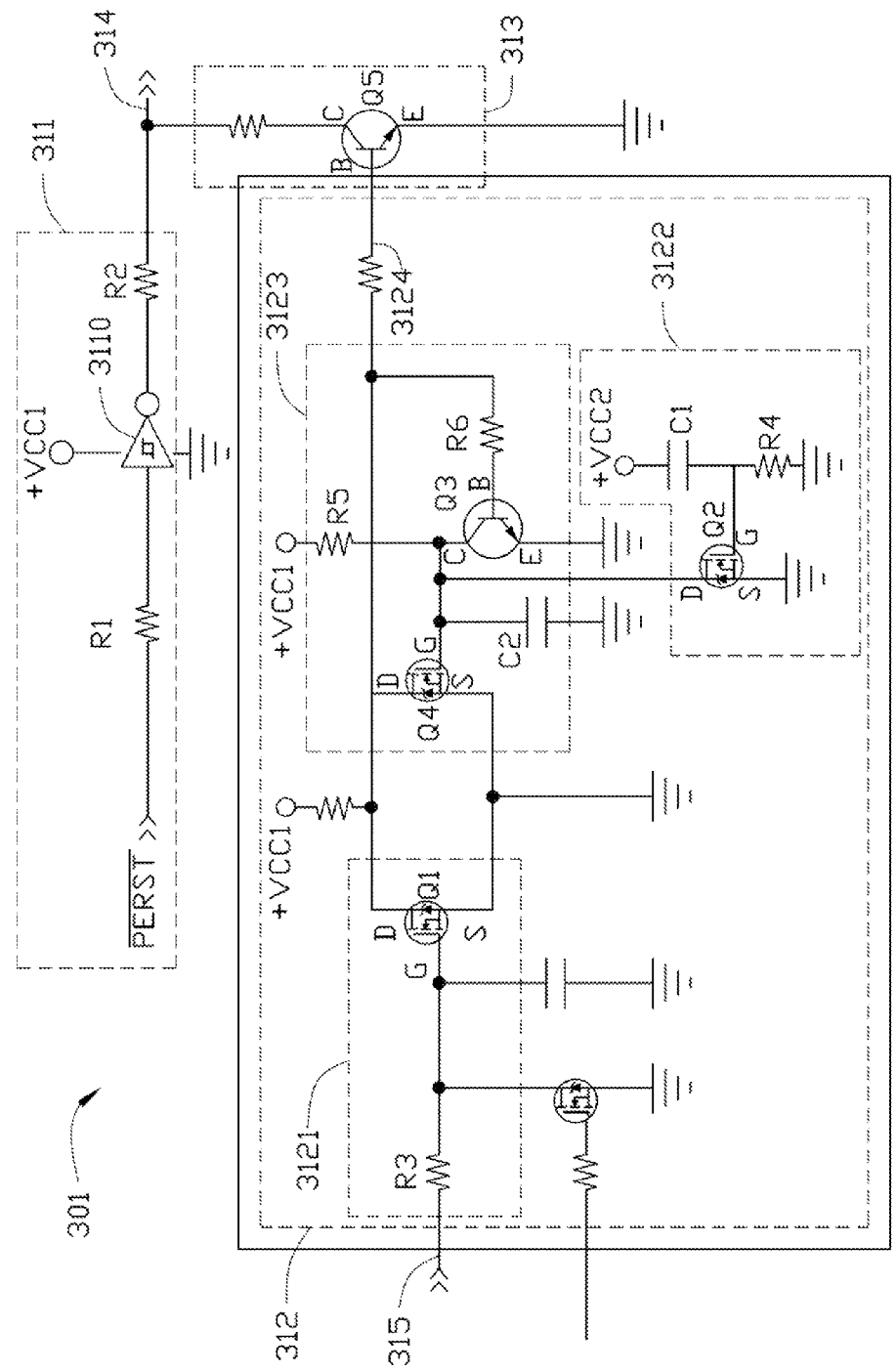
FIG. 3 is a circuit diagram of a control circuit of the computer of FIG. 1.

FIG. 2-3 illustrate the control circuit 301 comprises a first control module 311, a second control module 312, a switch module 313, and a control terminal 314. The first control module 311 is configured to couple to a reset terminal $\overline{PERST}$ of the addition card 400. The second control module 312 is configured to couple to the connecting terminal 315. The switch module 313 is configured to couple to the first control module 311 and the second control module 312. The control terminal 314 is configured to couple to the output circuit 302. The first control module 311 is configured to couple to the control terminal 314. The second control module 312 is configured to couple to the control terminal 314 via the switch module 313. The control terminal 314 is configured to output a first control signal to control the output circuit 302 to make the first response or output a second control signal to control the output circuit 302 to make the second response.

The first control module 311 comprises a resistor R1, a resistor R2, and an inverter 3110. One end of the resistor R1 is coupled to the reset terminal $\overline{PERST}$. The other end of the resistor R1 is coupled to an input terminal of the inverter 3110. One end of the resistor R2 is coupled to an output terminal of the inverter 3110. The other end of the resistor R2 is coupled to the control terminal 314.

The reset terminal $\overline{PERST}$ sends a first state signal when the computer 100 is working at the full speed. The first control module 311 outputs a first control signal via the control terminal 314 after receiving the first state signal. The reset terminal $\overline{PERST}$ sends a second state signal when the computer 100 is in the S3/S4 state. The first control module 311 outputs a second control signal via the control terminal 314 after receiving the second state signal. In one embodiment, a value of the first state signal is equal to a value of the second control signal, the value of the first state signal is a first value, a value of the second state signal is equal to the a value of the first control signal, and the value of the second state signal is a second value.

The second control module 312 comprises a first control unit 3121, a second control unit 3122, a bistable circuit 3123, and a switch terminal 3124. The first control unit 3121 is coupled to the switch terminal 3124 via the bistable circuit 3123. The second control unit 3122 is coupled to the switch terminal 3124 via the bistable circuit 3123. The second control module 312 is coupled to the switch module 313 via the switch terminal 3124.

The first control unit 3121 controls the switch module 313 to be switched off according to the switch signal via the bistable circuit 3123 when the computer 100 is in the S3/S4 state, thereby enabling the control terminal 314 to output the second control signal.

The second control unit 3122 controls the switch module 313 to be switched on via the bistable circuit 3123 when the computer 100 is in the full-speed operation state, thereby enabling the control terminal 314 to output the first control signal.

The first control unit 3121 comprises a FET Q1 and a resistor R3. One end of the resistor R3 is coupled to the connecting terminal 315 to receive the switch signal. The other end of the resistor R3 is coupled to the bistable circuit 3123 via the FET Q1. In one embodiment, the switch signal is a pulse signal, the FET Q1 is an n-channel FET, a gate terminal of the FET Q1 is coupled to the resistor R3, a drain terminal of FET Q1 is coupled to the bistable circuit 3123, and a source terminal of the FET Q1 is grounded.

The second control unit 3122 comprises a FET Q2, a resistor R4, and a capacitor C1. The resistor R4 is coupled to the capacitor C1. The FET Q2 is coupled to the bistable circuit 3123 and a node between the resistor R4 and the capacitor C1. In one embodiment, the FET Q2 is an n-channel FET, a gate terminal of the FET Q1 is coupled to the node between the resistor R4 and the capacitor C1, a drain terminal of the FET Q2 is coupled to the bistable circuit 3123, and a source terminal of the FET Q2 is grounded.

The bistable circuit 3123 comprises a FET Q3, a FET Q4, a capacitor C2, a resistor R5, and a resistor R6. In one embodiment, the FET Q3 is an npn triode and the FET Q4 is an n-channel FET. A collector of the FET Q3 is coupled to the capacitor C2, the resistor R5, a gate terminal of the FET Q4, and the second control unit 3122. A drain terminal of the FET Q4 is coupled to the first control unit 3121 and the switch terminal 3124. The drain terminal of the FET Q4 is coupled to a base of the FET Q3 via the resistor R6.

The switch module 313 comprises a FET Q5. In one embodiment, the FET Q5 is an npn triode, a base of the FET Q5 is coupled to the switch terminal 3124, a collector of the FET Q5 is coupled to the control terminal 314, and an emitter of the FET Q5 is grounded.

Figure 4:
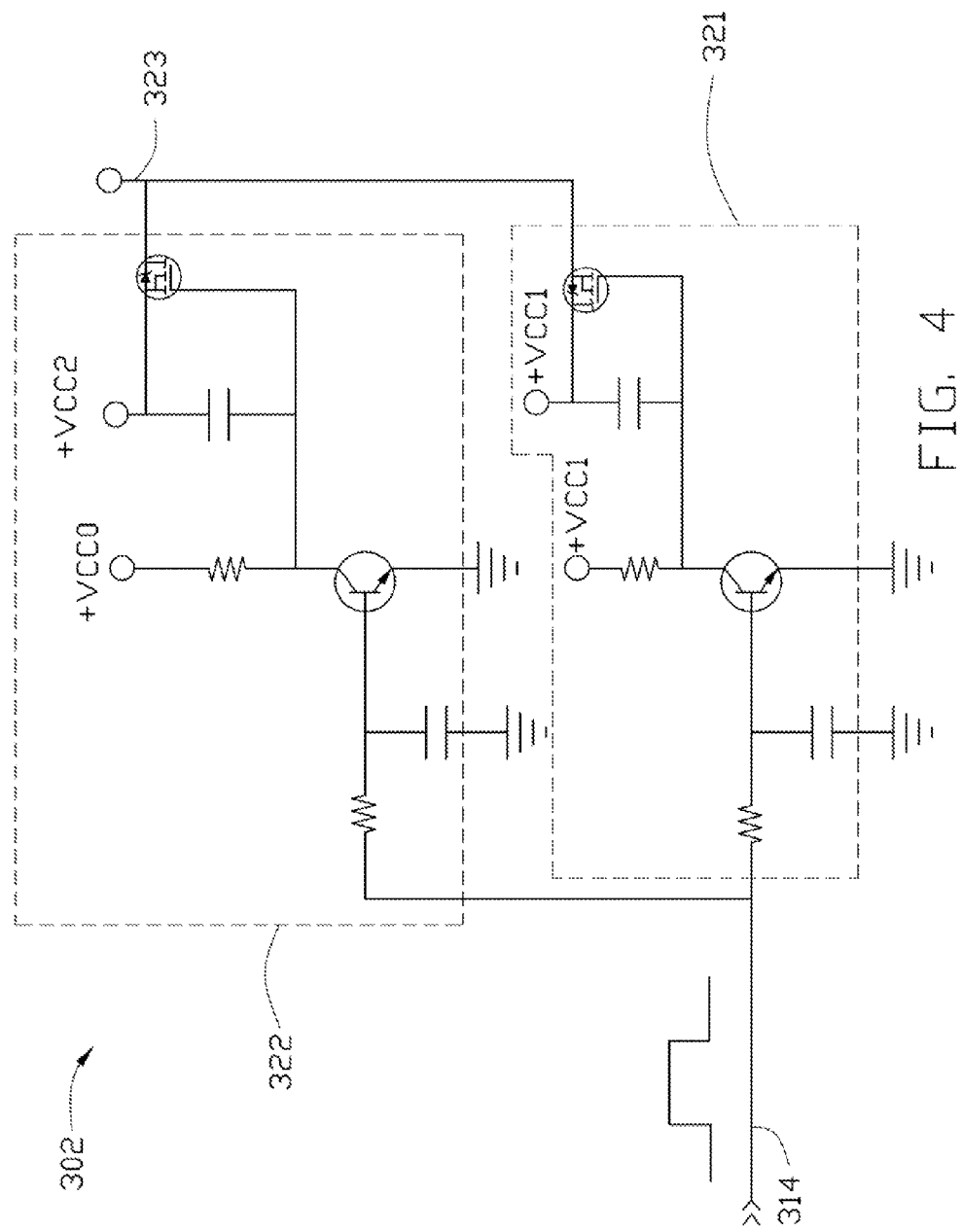
FIG. 4 is a circuit diagram of an output circuit of the computer of FIG. 1.

FIG. 4 illustrates that the output circuit 302 comprises a first output module 321, a second output module 322, and a power supply terminal 323. The first output module 321 is configured to make the first response. The second output module 322 is configured to make the second response. The control terminal 314 is coupled to the first output module 321 and the second output module 322. The first output module 321 and the second output module 322 are coupled to the power supply terminal 323.

The first output module 321 responses to the second control signal to enable the power supply terminal 323 to output the first voltage Vcc1 when the second control module 312 outputs the second control signal, thus the motherboard 200 outputs the first voltage Vcc1 to supply the addition card 400. The second output module 322 responses to the first control signal to enable the power supply terminal 323 to output the second voltage Vcc2 when the second control module 312 outputs the first control signal, thus the motherboard 200 outputs the second voltage Vcc2 to supply the addition card 400.

In one embodiment, the first value is a high level signal value and the second value is a low level signal value.

The second control unit 3122 controls the switch module 313 to be switched on when the computer 100 is working at the full speed, thereby enabling the motherboard 200 to output the second voltage Vcc2 to supply the addition card 400.

The first control unit 3121 controls the switch module 313 to be switched off according to the switch signal when the computer 100 is in the S3/S4 state. The first control module 311 controls the control terminal 314 to output the second control signal, thereby enabling the motherboard 200 to output the first voltage Vcc1 to supply the addition card 400. Thus, the addition card 400 can be woken.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A computer comprising:
a motherboard;
a resistor;
a control circuit coupled to the resistor; and
an output circuit coupled to the control circuit;
wherein the control circuit is configured to control the output circuit to make a first response when the computer is in a S3/S4 state;
wherein the control circuit is further configured to control the output circuit to make a second response when the computer is working at a full speed;
wherein the motherboard is configured to output a first voltage to supply an addition card when the output circuit makes the first response;
wherein the motherboard is further configured to output a second voltage to supply the addition card when the output circuit makes the second response; and
the resistor is coupled to a first detection terminal and a second detection terminal of the addition card, and enables the control circuit to receive a switch signal when the computer is in the S3/S4 state.

2. The computer of claim 1, wherein the control circuit comprises a first control circuit, a second control circuit, the first control circuit is coupled to a reset terminal of the addition card, and the second control circuit is coupled to the motherboard.

3. The computer of claim 2, wherein the control circuit further comprises a switch circuit, the switch circuit is coupled to the first control circuit and the second control circuit, the second control circuit controls the switch circuit to be switched off according to the switch signal, and thereby enabling the control circuit to output a first control signal.

4. The computer of claim 3, wherein the second control circuit comprises a first control unit coupled to the switch circuit and the first control unit controls the switch circuit to be switched off.

5. The computer of claim 3, wherein the second control circuit further comprises a second control unit coupled to the switch circuit, the second control unit controls the switch circuit to be switched on when the computer is working at the full speed, and thereby enabling the control circuit to output a second control signal.

6. The computer of claim 5, wherein a value of the first control signal is a high level signal value and a value of the second control signal is a low level signal value.

7. The computer of claim 2, wherein the control circuit comprises a control terminal outputs the first or the second control signal, the first control circuit is coupled to the control terminal, and the second control circuit is coupled to the control terminal.

8. The computer of claim 7, wherein the control circuit further comprises a switch circuit, the switch circuit comprises a FET, a base of the FET is coupled to the second control circuit, a collector of the FET is coupled to the control terminal, and an emitter of the FET is grounded.

9. The computer of claim 7, wherein the first control circuit comprises an inverter, the inverter is coupled to a reset terminal of the addition card and the control terminal, and the inverter controls the control circuit to output the first or the second control signal according to a state signal from the reset terminal.

10. A computer comprising:
a motherboard;
a resistor couplable to the motherboard;
a control circuit coupled to the resistor; and
an output circuit couplable to an addition card;
wherein the control circuit is coupled between the resistor and the output circuit;
wherein the control circuit is configured to control the output circuit to make a first response when the computer is in a S3/S4 state;
wherein the control circuit is further configured to control the output circuit to make a second response when the computer is working at a full speed;
wherein the motherboard is configured to output a first voltage when the output circuit makes the first response and output a second voltage when the output circuit makes the second response; and
wherein the first voltage is configured to supply the addition card via the control circuit and the second voltage is configured to supply the addition card via the control circuit; and
the resistor is coupled to a first detection terminal and a second detection terminal of the addition card, and enables the control circuit to receive a switch signal when the computer is in the S3/S4 state.

11. The computer of claim 10, wherein the control circuit comprises a first control circuit, a second control circuit, and a switch circuit, the switch circuit is coupled to the first control circuit and the second control circuit, the first control circuit is coupled to a reset terminal of the addition card, and the second control circuit is coupled to the motherboard.

12. The computer of claim 11, wherein the second control circuit controls the switch circuit to be switched off according to the switch signal, and thereby enabling the control circuit to output a first control signal.

13. The computer of claim 12, wherein the second control circuit comprises a first control unit coupled to the switch circuit and the first control unit controls the switch circuit to be switched off.

14. The computer of claim 11, wherein the second control circuit further comprises a second control unit coupled to the switch circuit, the second control unit controls the switch circuit to be switched on when the computer is working at the full speed, and thereby enabling the control circuit to output a second control signal.

15. The computer of claim 11, wherein the control circuit comprises a control terminal outputs the first or the second control signal, the first control circuit is coupled to the control terminal, and the second control circuit is coupled to the control terminal via the switch circuit.

16. The computer of claim 15, wherein the switch circuit comprises a FET, a base of the FET is coupled to the second control circuit, a collector of the FET is coupled to the control terminal, and an emitter of the FET is grounded.

17. The computer of claim 15, wherein the first control circuit comprises an inverter, the inverter coupled to a reset terminal of the addition card and the control terminal, and the inverter controls the control circuit to output the first or the second control signal according to a state signal from the reset terminal.

* * * * *